(12) United States Patent
Shpak

(10) Patent No.: US 8,648,711 B2
(45) Date of Patent: Feb. 11, 2014

(54) APPARATUS FOR THE WIRELESS MONITORING OF LINEAR HEAT DETECTION SYSTEMS FOR STORAGE TANK ROOFS

(75) Inventor: John Dale Shpak, Victoria (CA)

(73) Assignee: Syscor Controls & Automation Inc., Victoria, BC (CA)

( * ) Notice: Subject to any disclaimer, the term of this patent is extended or adjusted under 35 U.S.C. 154(b) by 102 days.

(21) Appl. No.: 13/378,498

(22) PCT Filed: Jul. 7, 2010

(86) PCT No.: PCT/IB2010/053100
§ 371 (c)(1),
(2), (4) Date: Dec. 15, 2011

(87) PCT Pub. No.: WO2011/004326
PCT Pub. Date: Jan. 13, 2011

(65) Prior Publication Data
US 2012/0098658 A1    Apr. 26, 2012

Related U.S. Application Data

(60) Provisional application No. 61/270,395, filed on Jul. 9, 2009.

(51) Int. Cl.
*G08B 1/08* (2006.01)
*G08B 29/00* (2006.01)

(52) U.S. Cl.
USPC ............. 340/539.1; 340/539.27; 340/508; 340/584; 169/68

(58) Field of Classification Search
USPC ............. 340/539.1, 539.11, 539.26, 870.07, 340/508, 539.24, 539.27, 693.1, 693.5, 584, 340/506; 702/35, 183, 182; 169/11, 43, 46, 169/68; 324/539, 543, 544; 73/305
See application file for complete search history.

(56) References Cited

U.S. PATENT DOCUMENTS

| | | | | |
|---|---|---|---|---|
| 4,936,388 A | * | 6/1990 | Le Lande, Jr. | 169/46 |
| 5,548,933 A | * | 8/1996 | Sharma et al. | 52/192 |
| 7,356,444 B2 | * | 4/2008 | Blemel | 702/183 |
| 8,264,373 B2 | * | 9/2012 | Hagg | 340/870.07 |
| 2008/0272906 A1 | * | 11/2008 | Breed | 340/539.11 |

* cited by examiner

*Primary Examiner* — Anh V La
(74) *Attorney, Agent, or Firm* — Davis & Bujold, PLLC; Michael J. Bujold

(57) ABSTRACT

An fire monitoring apparatus for large storage tanks of combustible fluids permits wireless communication between a Linear Heat Detector system and a Fire Control system. The system comprises a Communication Unit and a Remote Unit. The Communication Unit relays status and control signals between the Fire Control system and the Remote Unit. The communication between the Communication Unit and the Remote Unit is wireless. The Remote Unit is self-powered using solar cells, batteries, or a combination thereof.

6 Claims, 3 Drawing Sheets

APPARATUS FOR THE WIRELESS MONITORING OF LINEAR HEAT DETECTION SYSTEMS FOR STORAGE TANK ROOFS

CROSS-REFERENCE TO RELATED APPLICATIONS

This application claims the benefit of U.S. Provisional Patent Application 61/270,395 filed with the USPTO on Jul. 9, 2009. The Inventors have filed related applications regarding floating storage tank roofs as disclosed in PCT Applications PCT/CA2009/000388, filed on Mar. 24, 2009 and PCT/IB2009/05411 filed on Sep. 21, 2009.

FIELD OF THE INVENTION

This invention relates to the wireless monitoring of linear heat detection systems deployed on the roofs of large storage tanks, including tanks used for storing liquid petroleum products or other chemicals. The invention comprises two units that communicate using wireless means: a self-powered Remote Unit that connects to the linear heat detector and a Communication Unit that is linked to the Fire Control Panel. The invention provides a wireless link between the monitoring system and the linear heat detector and thereby supersedes the conventional wired connection between the linear heat detectors and the Fire Control Panel. The Communication Unit can be connected to a Fire Control Panel using wired or wireless means. The proposed invention can be used for routine status monitoring or for notifying plant operators in the event of alarm conditions. The invention is suitable for encapsulation and use in harsh environments.

BACKGROUND OF THE INVENTION

Large storage tanks are often cylindrical and have a circular floating roof. The roof floats on the surface of the liquid, thereby decreasing the vapor space inside of the tank. A floating roof may be required for reasons of safety or for pollution reduction. The floating roof has a seal between its outer edge and the wall of the tank that helps to prevent the escape of the contained liquid or vapors from that liquid. This seal moves up and down with the roof as the liquid level changes.

There are two broad types of storage tanks that utilize floating roofs: tanks having an exposed floating roof and tanks having a fixed roof covering the floating roof. An advantage of the covered tank is that it protects the floating roof from undesirable effects from the external environment, such as rain or birds. A disadvantage of the covered tank is that volatile, explosive, corrosive, or toxic gasses or liquids can accumulate between the floating roof and the fixed roof.

When the contained liquid or its vapors are flammable, a substantial fire hazard can exist at the roof of the tank. The fuel for such a fire can be from the escape of liquid or vapor from the storage tank. The industry is therefore quite interested in monitoring systems that can be used to improve safety by identifying fires or any excessive heating conditions that may lead to fire.

The linear heat detector (LHD) is an existing technology that is typically realized using one of two configurations. With the first configuration, referred to as a "digital" LHD, a cable containing two wires is installed around the circumference of the tank between the primary seal and the outer seal of the tank. The digital LHD cable comprises two insulated steel conductors, which may be copper-coated. The insulated conductors are twisted in a helical configuration resulting in a residual spring-like stress in the cable. If the ambient temperature reaches the melting point of the insulating material, the conductors push their way through the insulation, thereby contacting one another and short-circuiting the two conductors. This short-circuit condition is detected by measuring the current flow through the LHD, thereby raising an alarm condition. When such a short-circuit condition occurs, it is necessary to replace the affected part of the LHD to restore normal operation.

The second LHD configuration, known as "analog" LHD, uses four wires: one pair of copper wires carries a reference current through the LHD loop. The second pair of wires is coated with a negative-temperature-coefficient (NTC) insulation. Elevated temperatures are detected by comparing the reference current to the current in the NTC-insulated loop. This approach has the advantage of supporting the estimation of loop temperature. This NTC-based system will continue to operate normally if an elevated temperature is subsequently reduced, provided that the elevated temperature was not high enough to permanently damage the cable.

In the current state-of-the-art, a lengthy umbilical cable is used to connect the LHD on the floating tank roof to the monitoring system connection that is located near the top of the tank. This umbilical cable is subjected to stresses from self-weight and stresses during tank movement or adverse weather conditions. It may subsequently fail, resulting in a loss of monitoring capability and necessitating costly repairs.

BRIEF SUMMARY OF THE INVENTION

The present invention provides a new wireless apparatus for connecting the LHD to the Fire Control Panel, thereby obsolescing the unreliable umbilical cable that is currently used. The invention also includes methods for reducing power consumption and for more accurately locating the fault in the cable that is causing an alarm condition.

The invention is comprised of a Remote Unit and a Communication Unit. The Remote Unit is wired to the LHD and generates the signals that are used to detect the condition of the LHD. The Remote Unit is located on the tank roof. It monitors the signals in the LHD and generates alarm conditions or status messages that are sent to the Communication Unit. The Communication Unit is typically located near the top of the cylindrical wall of the tank. It relays alarm or status messages to Fire Control Panel. The connection from the Communication Unit to the Fire Control Panel can be wired, for example, using a 20 mA current loop. Alternatively, the connection from the Communication Unit to the Fire Control Panel can be wireless, for example, using an existing wireless technology such as the SK2000 wireless device that is available from Saval NV.

Fire Control Panels are well-known in the current state-of-the-art and the Fire Control Panel is not discussed further.

The Remote Unit is self-powered, typically using batteries, solar cells, or a combination thereof. It consequently removes any requirement for wiring to the roof of the tank for the purpose of deploying a LHD system on the tank roof. The Remote Unit contains a microprocessor or microcontroller that is used for control signal generation and monitoring of the LHD, for assembling messages and transmitting them to the Communication Unit, and for interpreting messages from the Communication Unit. Since the only wired connection on the Remote Unit is to the LHD, the Remote Unit is well-suited for encapsulation and use in harsh environments.

There is no known existing apparatus that is similar to the current invention.

DETAILED DESCRIPTION OF THE INVENTION

Figure 1:
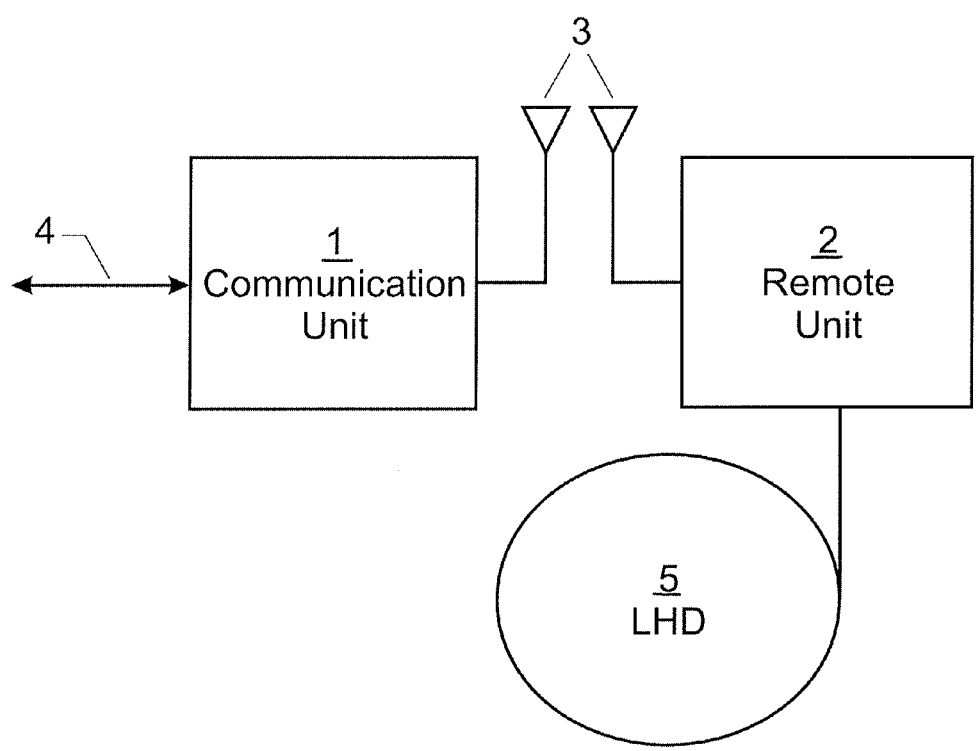
FIG. 1: Functional Block Diagram of the Proposed Apparatus

With reference to the block diagram in FIG. 1, the invention comprises a Communication Unit 1 and a Remote Unit 2 that communicate via wireless means using antennas 3. The configuration of the antennas 3 is not a facet of this invention.

The Communication Unit 1 is connected to the Fire Control Panel using a Communication Link 4 that is compatible with the Fire Control Panel. As examples, this Communication Link 4 could be a wired connection, such as a 20 mA current loop or an asynchronous serial link, or it could be a wireless connection such as the Saval SK2000. The Communication Unit 1 is typically deployed near the top of the wall of the storage tank.

The LHD 5 is wired to the Remote Unit 2, using either a two-wire or a four-wire connection, depending, respectively, on whether a "digital" LHD or an "analog" LHD is required. The invention can be readily configured for use with either type of LHD. The Remote Unit 2 is typically deployed on the floating roof of the storage tank.

Figure 2:
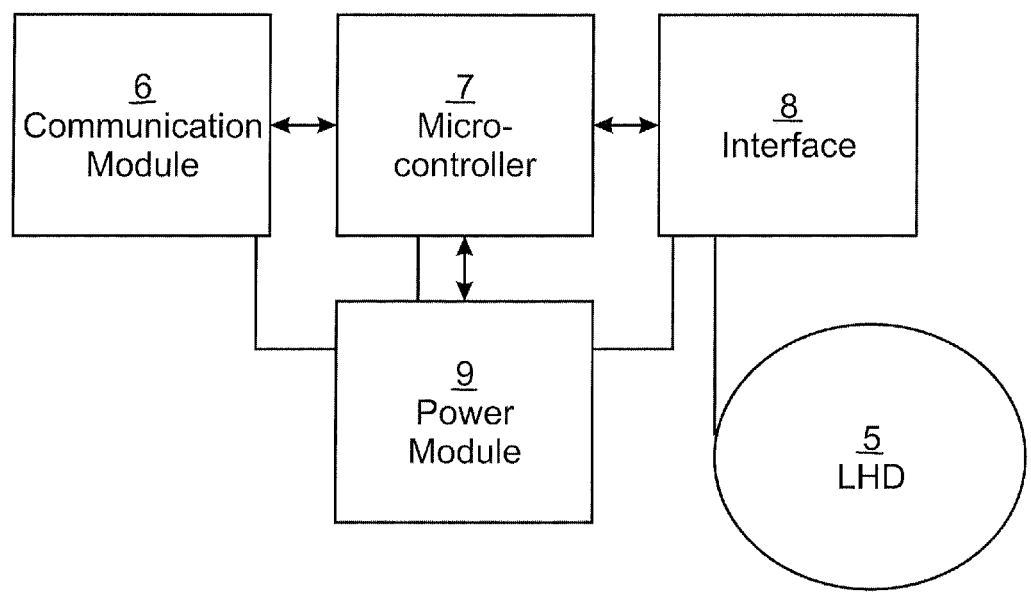
FIG. 2: Functional Block Diagram of the Remote Unit

With reference to the functional block diagram in FIG. 2, said Remote Unit minimally comprises a Power Module 9 and the following core functional modules: a Microcontroller 7; a Communications Module 6; and an Interface 8 to the LHD 5. Said Interface 8 may be integrated into the Microcontroller 7.

With reference to FIG. 2, the lines drawn with arrows between the Microcontroller 7, the Communications Module 6, and the Interface 8 indicate communication links; the solid lines from the Power Module 9 indicate power connections; and the solid line to the LHD 5 indicates a wired connection. Said communication links are shown as being bidirectional but unidirectional connections are also permissible. The communication link for the power module is optional.

Since the Microcontroller 7 is capable of both generating and analyzing signals, it can be used to enhance the detection capabilities of the LHD. Therefore, it can support measurement techniques that are in addition to the measurement of current and voltage in the LHD that is prevalent in the current state-of-the-art. In the proposed invention, time-domain reflectometry (TDR) can be supported by the Microcontroller software. With TDR, a signal comprising a short pulse or chirp is sent into the LHD via the Interface 8. The Microcontroller then measures the response from the LHD using an analog-to-digital converter. Using well-known techniques, the Microcontroller can then compute the distance to the fault or short-circuit in the LHD. Using TDR results in a more accurate estimate of the location of the fault than using conventional resistance-based measurements.

The Microcontroller 7 can also be used to help conserve power. In conventional LHD systems, a current source is applied continuously to the LHD, thereby continuously consuming power. In the proposed invention, power can be conserved either by periodically applying current to the LHD or by periodically applying the aforementioned TDR technique. For said periodic application of current, the current must be applied to the LHD for a sufficient period of time, known as the settling time, for the transient response of the LHD to decay to a level where the voltage or current in the LHD can be reliably measured. Since the LHD acts as a linear electrical transmission line, the settling time for the LHD can be easily predicted.

Further, the Remote Unit can operate using low voltages and low power on its connection to the LHD, thereby conserving power and reducing the risk of sparks that could ignite flammable vapors.

The wire interface on Remote Unit that is described in this application is programmable, thereby making it suitable for use with other current-loop sensors or voltage-level sensors.

The Remote Unit is powered by a Power Module employing batteries, photovoltaic cells, radio-frequency power transmission, optical power transmission, or any combination thereof. The Communication Unit can be line powered, use batteries, use photovoltaic cells, or any combination thereof.

To prevent improper operation due to the proximity of other Communication Units or Remote Units, each Remote Unit or Communication Unit can be uniquely identified by one or more identification numbers: an electronic identification number that is set up during system configuration or a unique electronic identification number that is set up before system configuration. The identification number need not be globally unique: it can be unique to a particular deployment.

In the current embodiment, the Communication Unit is comprised of a Freescale MC13224 that contains a radio-frequency communications module for wirelessly communicating with the Remote Units; and a 20 mA current loop interface for connecting to an existing Fire Control Panel. The Communication Unit is used to relay information to or from a Remote Unit and to or from a Fire Control Panel.

In the current embodiment, power for the Communication Unit is scavenged from its interface to the 20 mA current loop. Said current loop, which is powered by the Fire Control Panel, can easily supply the power requirements of the Communication Unit without any disruption to its normal operation.

The microprocessor is programmable and can have software for computing alarm conditions from signals gathered from the LHD. Optionally, the microprocessor can be re-programmed in the field by wired or wireless means.

For either the Communication Unit or the Remote Unit, the microcontroller and the communications module may be integrated into a single device such as the Freescale MC13224.

Figure 3:
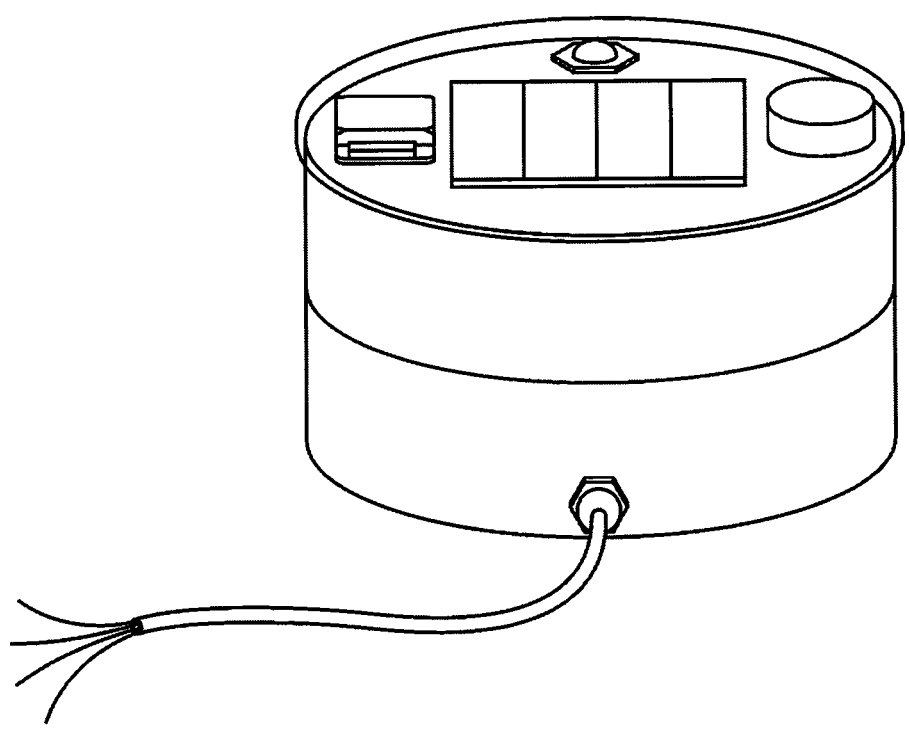
FIG. 3: Pictorial Drawing of the Remote Unit

With reference to FIG. 3, the Remote Unit is preferentially encapsulated for use in harsh environments, including but not limited to chemical plants, petrochemical plants, and marine environments. The alternative to encapsulation is mechanical sealing systems, such as enclosures sealed with gaskets. As illustrated in FIG. 3, the two or four wires that are used to connect to the LHD preferentially extend from the Remote Unit so that the Remote Unit and the LHD can be interconnected using a standard junction box. Preferentially, the Remote Unit is immersible.

In the current embodiment of the Remote Unit, the core functional modules displayed in FIG. 2 are implemented using a Freescale MC13224.

Communications among the system components (the Remote Unit, the Communication Unit, and the Fire Control Panel) may be initiated using one or more of the methods described in the following three paragraphs. In all cases, communications between any Remote Unit and the Fire Control Panel must pass through a Communication Unit.

The Fire Control Panel can send a request to a Remote Unit. The Remote Unit will subsequently reply with the requested information. This type of communications is referred to as polling.

The Remote Unit can send periodic status messages to the Fire Control Panel. These periodic messages can contain information about the LHD; alarm status; and/or information regarding the state of the Remote Unit, such as battery condition. This type of communications is referred to as periodic.

The Remote Unit can send messages to the Fire Control Panel in the event that that an alarm condition has been detected by the Remote Unit. This type of communication is referred to as event-driven.

What is claimed is:

1. An apparatus for wireless communication between a Linear Heat Detector system and a Fire Control system comprising in combination:
   a cable consisting of two conductors having a residual stress and separated by an insulating material, the cable forming part of the Linear Heat Detector system;
   a Remote Unit having a connection with the cable that uses sufficiently low voltage and low power to avoid igniting flammable vapors;
   a Communication Unit connected to the Fire Control system, the Communication Unit being in wireless communication with the Remote Unit,
   wherein the Communication Unit relays status and control signals between the Fire Control system and the Remote Unit, the connection between the cable and the Remote Unit normally showing no current flow as long as the two conductors remain separated by the insulating material, upon an ambient temperature reaching the melting point of the insulating material, the conductors push their way through the insulating material contacting one another to create a short-circuit condition resulting in current flow to the Remote Unit which is communicated by the Remote Unit to the Communication Unit; and
   the Remote Unit is self-powered using solar cells, batteries, or a combination thereof.

2. The apparatus of claim 1 wherein current is applied to the Linear Heat Detector at programmed intervals.

3. The apparatus of claim 1 wherein the distance to the fault is computed using time-domain reflectometry.

4. The apparatus of claim 1 wherein the Remote Unit is encapsulated for use in harsh environments.

5. The apparatus of claim 1 wherein the Remote Unit is connected to the Linear Heat Detector through an environmentally-sealed connector.

6. An apparatus for wireless communication between a Linear Heat Detector system and a Fire Control system, the apparatus comprising:
   a cable comprising two conductors having a residual stress and separated from one another by an insulating material, and the cable forming part of the Linear Heat Detector system;
   a Remote Unit having a connection with the cable that uses relatively low voltage and low power so as to avoid ignition of any flammable vapor;
   a Communication Unit connected to the Fire Control system, and the Communication Unit being in wireless communication with the Remote Unit,
   wherein the Communication Unit relays status and control signals between the Fire Control system and the Remote Unit, the connection between the cable and the Remote Unit normally permitting any current flow as long as the two conductors remain separated from one another by the insulating material, but, upon ambient temperature reaching a melting point of the insulating material, the conductors pass through the insulating material and contact one another thereby creating a short-circuit condition resulting in current flow to the Remote Unit which is communicated, by the Remote Unit, to the Communication Unit; and
   the Remote Unit is self-powered using at least one of solar cells, batteries or a combination thereof.

* * * * *

UNITED STATES PATENT AND TRADEMARK OFFICE
Certificate

Patent No. 8,648,711 B2

Patented: February 11, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dale John Shpak, Victoria (CA); Nikolay Nikolov Tzonev, Victoria (CA) and David William Sime, Victoria (CA).

Signed and Sealed this Seventeenth Day of June 2014.

BENJAMIN C. LEE
*Supervisory Patent Examiner*
Art Unit 2684
Technology Center 2600